(12) United States Patent
Watanabe et al.

(10) Patent No.: US 8,101,270 B2
(45) Date of Patent: Jan. 24, 2012

(54) BONDING MATERIAL FOR HONEYCOMB STRUCTURE AND HONEYCOMB STRUCTURE UTILIZING THE MATERIAL

(75) Inventors: Atsushi Watanabe, Nagoya (JP); Suguru Kodama, Nagoya (JP); Shuichi Ichikawa, Handa (JP); Fumiharu Sato, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/688,055

(22) Filed: Jan. 15, 2010

(65) Prior Publication Data

US 2010/0119769 A1    May 13, 2010

Related U.S. Application Data

(63) Continuation of application No. PCT/JP2008/063359, filed on Jul. 25, 2008.

(30) Foreign Application Priority Data

Jul. 26, 2007  (JP) ................. 2007-195005

(51) Int. Cl.
 *B32B 5/16*    (2006.01)
(52) U.S. Cl. ........ 428/323; 428/116; 428/332; 428/338; 428/688; 428/689; 428/698; 428/702; 106/400
(58) Field of Classification Search .......... None
 See application file for complete search history.

(56) References Cited

U.S. PATENT DOCUMENTS

| | | | |
|---|---|---|---|
| 5,914,187 A | 6/1999 | Naruse et al. | |
| 2003/0027919 A1* | 2/2003 | Fritz | 524/494 |
| 2005/0050845 A1 | 3/2005 | Masukawa et al. | |
| 2005/0076626 A1 | 4/2005 | Kudo et al. | |
| 2005/0109023 A1 | 5/2005 | Kudo et al. | |
| 2006/0101747 A1* | 5/2006 | Masukawa et al. | 52/302.1 |
| 2006/0240212 A1* | 10/2006 | Masukawa et al. | 428/58 |
| 2006/0288650 A1* | 12/2006 | Tanaka et al. | 51/309 |
| 2008/0138568 A1 | 6/2008 | Tomita et al. | |
| 2008/0241015 A1 | 10/2008 | Kudo et al. | |
| 2008/0248238 A1 | 10/2008 | Tomita et al. | |

FOREIGN PATENT DOCUMENTS

| | | |
|---|---|---|
| EP | 1 930 061 A1 | 6/2008 |
| EP | 2 123 617 A1 | 11/2009 |
| FR | 2 886 868 A1 | 12/2006 |
| JP | 08-028246 A1 | 1/1996 |
| JP | 11-166158 A1 | 6/1999 |
| JP | 2000-007455 A1 | 1/2000 |
| JP | 2004-130176 A1 | 4/2004 |
| WO | 03/067041 A1 | 8/2003 |
| WO | 2007/069674 A1 | 6/2007 |

* cited by examiner

*Primary Examiner* — Ling Xu
(74) *Attorney, Agent, or Firm* — Burr & Brown

(57) ABSTRACT

A bonding material for a honeycomb structure comprises inorganic particles in which D90/D10 is from 10 to 500, D10 is 100 μm or less and D90 is 4 μm or more, and the D10 and D90 are the values of 10% diameter and 90% diameter from a smaller particle diameter side, respectively, in volume-based integrated fractions of a particle diameter distribution measurement by a laser diffraction/scattering method.

7 Claims, 1 Drawing Sheet

BONDING MATERIAL FOR HONEYCOMB STRUCTURE AND HONEYCOMB STRUCTURE UTILIZING THE MATERIAL

BACKGROUND OF THE INVENTION

The present invention relates to a bonding material for a honeycomb structure and a honeycomb structure utilizing the bonding material. Particularly, it relates to a bonding material for manufacturing a honeycomb structure comprising a bonded honeycomb segment article in which the mutual bonding surfaces of a plurality of honeycomb segments are integrally bonded via bonding material layers and an outer peripheral coat layer which coats the outer peripheral surface of the bonded honeycomb segment article and having a structure in which a plurality of cells as through channels of a fluid are arranged in parallel with one another in a central axis direction, and it also relates to a honeycomb structure utilizing the bonding material. More particularly, it relates to a bonding material for a honeycomb structure preferably usable for a support for catalyst utilizing a catalytic function in an internal combustion engine, a boiler, a chemical reaction device, a reforming unit for a fuel cell or the like or for a filter for collecting fine particles in an exhaust gas or the like, and it also relates to a honeycomb structure manufactured by using the bonding material. Further particularly, it relates to a bonding material for a honeycomb structure, which has, for example, a large size but in which a plurality of honeycomb segments are securely bonded to one another, and a honeycomb structure.

A honeycomb structure made of a ceramic material is used for a support for catalyst utilizing a catalytic function in an internal combustion engine, a boiler, a chemical reaction device, a reforming unit for a fuel cell or the like or especially for a filter (hereinafter referred to as the DPF) for collecting diesel fine particles or the like.

In this type of ceramic honeycomb structure, a plurality of porous honeycomb segments having a large number of through pores partitioned by partition walls and extending in an axial direction are bound via adhesive layers to construct the structure (e.g., see Patent Document 1). That is, the ceramic honeycomb structure has a constitution in which the porous honeycomb segments having a square post-like shape are combined in rows and bonded to one another via the adhesive layers. At this time, after interposing the adhesive layer between the adhering surfaces of the porous honeycomb segments, the honeycomb segments are bonded while applying a pressing force thereto.

As a bonding material for bonding the honeycomb segments, silicon carbide powder has been suggested, and it has been pointed out the "silicon carbide powder has particle diameters of 0.01 to 100 µm, preferably 0.1 to 15 µm, more preferably 0.1 to 10 µm. This reason is that if the particle diameters exceed 100 µm, a adhesion force (the strength) and a heat conductivity are decreased. On the other hand, if the particle diameters are less than 0.01 cost increase is incurred" (e.g., see Patent Document 2).

Moreover, it is suggested in Patent Document 2 that ceramic member are integrally adhered via a seal material and that inorganic powder or whiskers of at least one or more selected from the group consisting of silicon carbide, silicon nitride and boron nitride are used as inorganic particles. However, in the method of Patent Document 2, it has been difficult to achieve a balance between the improvement of the flow properties as well as water-holding properties of a bonding material slurry and the increase of the heat conductivity. When the inorganic particles of the bonding material slurry are coarse, a grain boundary having a thermal resistance decreases, and hence the heat conductivity can be increased. However, when the inorganic particles are coarse, the flow properties of the bonding material slurry are remarkably impaired, and hence it is difficult to completely fill a bonded part with the slurry, thereby causing the decrease of the bonding strength. Moreover, when the grain size distribution of the inorganic particles is coarse, the surface of the slurry immediately dries, which disturbs the interface adherence of the bonded part sometimes.

[Patent Document 1] JP-A-2000-7455
[Patent Document 2] JP-A-08-28246

SUMMARY OF THE INVENTION

The present invention has been developed in view of such problems of the conventional technology, and an object thereof is to achieve a balance between the improvement of the flow properties as well as the water-holding properties of the bonding material slurry and the increase of heat conductivity. In consequence, the object thereof is to provide a bonding material for a honeycomb structure which is securely bonded without casing any bonding defect such as the generation of a gap in a bonded part, and a honeycomb structure bonded with such a bonding material.

To achieve the above object, according to the present invention, a bonding material for a honeycomb structure and the honeycomb structure bonded with such a bonding material are provided as follows.

According to a first aspect of the present invention, a bonding material for a honeycomb structure is provided, comprising inorganic particles in which $D90/D10$ is from 10 to 500, $D10$ is 100 µm or less and $D90$ is 4 µm or more, and the $D10$ and $D90$ are the values of 10% diameter and 90% diameter from a smaller particle diameter side, respectively, in volume-based integrated fractions of a particle diameter distribution measurement by a laser diffraction/scattering method.

According to a second aspect of the present invention, the bonding material for the honeycomb structure according to the first aspect is provided, wherein the long axis/short axis ratio of the inorganic particles is in a range of 1.0 to 4.0.

According to a third as aspect of the present invention, the bonding material for the honeycomb structure according to the first or second aspects is provided, which comprises the inorganic particles of at least one selected from the group consisting of silicon carbide, silicon nitride, aluminum nitride, boron nitride, silica, alumina, mullite, zirconia, zirconium phosphate, alumina titanate and titania.

According to a fourth aspect of the present invention, the bonding material for the honeycomb structure according to any one of the first to third aspects is provided, which further comprises oxide fibers having an average length of 30 to 600 µm and an average diameter of 1 to 20 µm.

According to a fifth aspect of the present invention, the bonding material for the honeycomb structure according to any one of the first to fourth aspects is provided, which further comprises a colloidal oxide and an inorganic binder.

According to a sixth aspect of the present invention, the bonding material for the honeycomb structure according to any one of the first to fourth aspects is provided, which further comprises an organic binder and a hollow filler.

According to a seventh aspect of the present invention, a honeycomb structure which is bonded with the bonding material according to any one of the first to sixth aspects of the present invention.

According to the present invention, the flow properties as well as water-holding properties of the bonding material slurry can be secured, and the segments can easily be bonded by using such a bonding material, while achieving the increase of the heat conductivity of the bonding material of the prepared honeycomb structure. Furthermore, according to the present invention, fine particles function as rollers on coarse particles to secure the flow properties of the slurry. Moreover, the strong capillary force of fine pores formed by the fine particles keeps the moisture-holding properties of the slurry to secure the flow properties of the slurry. In addition, the coarse part of the inorganic particles can achieve the increase of the heat conductivity of the bonding material, so that it is possible to balance the contradictory properties, that is, the improvement of the flow properties as well as water-holding properties of the slurry and the increase of the heat conductivity.

DESCRIPTION OF REFERENCE NUMERALS

Figure 1A:
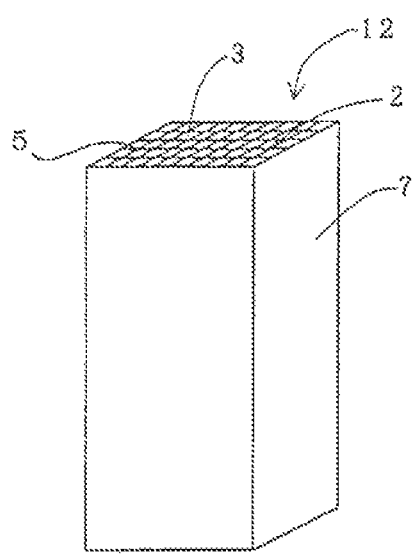
FIG. 1A is a drawing for explaining one embodiment of a honeycomb structure of the present invention, and shows a perspective view of a honeycomb segment.

1: honeycomb structure; 2: partition wall; 3: cell; 5: cell structure; 7: outer wall; 8: bonding material; and 12: honeycomb segment.

DETAILED DESCRIPTION OF THE INVENTION

Hereinafter, an embodiment of the present invention will be described, and it should be understood that the present invention is not limited to the following embodiment and that the one which added appropriate alteration, modification or the like to the following embodiment based on the usual knowledge of a person with ordinary skill without departing from the scope of the present invention is included in the scope of the present invention.

The present invention relates to a bonding material for manufacturing a honeycomb structure, and a honeycomb structure manufactured by using the bonding material. The bonding material is slurried before being dried, and the flow properties or water-holding properties are important, but after the material is dried or thermally treated, the slurried state is eliminated. In the present invention, the bonding material has both the slurried state before being dried and a state after being dried or thermally treated. Moreover, in the present invention, as described above, the bonding material has a flowable slurried state on occasion, and hence in the present description, the bonding material is referred to as a bonding material slurry sometimes.

In general, inorganic particles or the like form a particle group constituted of a large number of particles, and in the particle group, a plurality of particles having different sizes are mixedly present. A particle diameter distribution measurement by a laser diffraction/scattering method is one of a large number of particle distribution measurements. The distribution pattern of intensities of light emitted by particles as measurement targets is the superimposition of diffraction/scattering light from the respective particles, and hence this light intensity distribution pattern can be detected and analyzed to obtain the sizes and content ratios of the particles (grain size distribution).

The particle diameter of the inorganic particles or the like is usually the average particle diameter of the present particles or the like, and it is considered that the particle diameters are distributed in a constant range around the average particle diameter. Examples of this obtained particle distribution having a so-called one peak include a sharp particle distribution and a broad particle distribution. Here, it is considered that the broad particle distribution is usually a particle distribution curve which does not have any sharp peak, that is, a particle distribution of the particle diameters in a broad range. As the particles having the broad particle distribution, not only relatively large particles but also medium and small particles are present.

Furthermore, the investigation of the particle distribution of the inorganic particles or the like reveals that the particle distribution having two or more peaks is also present. When such inorganic particles or the like are manufactured, for example, particle groups having different average particle diameters can be mixed to easily obtain the particles.

In the present invention, values D10 and D90 of 10% diameter and 90% diameter from a smaller particle diameter side in volume-based integrated fractions of the particle diameter distribution measurement by the laser diffraction/scattering method are obtained to obtain the particle distribution. In the present invention, the inorganic particles having the broad particle distribution are utilized. In the present invention, the particle distribution is broadened by broadening the particle distribution having one peak or the particle distribution having two or more peaks. When the broad particle distribution is provided, the fine particles (the particles having a relatively small particle diameter system) function like the rollers on coarse particles (particles having a relatively large particle diameter system), so that the flow properties of the slurry can be secured.

In the present invention, the broadening of the particle distribution is evaluated by obtaining D90/D10 of the inorganic particles in the bonding material (including the bonding material slurry). D90/D10 is preferably from 10 to 500, especially preferably from 10 to 430. D10 is preferably 100 μm or less, more preferably 50 μm or less, especially preferably 15 μm or less. D90 is preferably 4 μm or more, especially preferably 8 μm or more. Moreover, in the range of the particle distribution of the particles in which D90/D10 is from 10 to 500, D10 is 100 μm or less, and D90 is 4 μm or more, the present invention exerts an effect. In the range of the particle distribution of the particles in which D90/D10 is from 10 to 430, D10 is 15 μm or less, and D90 is 8 μm or more, the present invention remarkably exerts the effect.

Moreover, the strong capillary force of the fine pores formed by the fine particles can keep the moisture-holding properties of the slurry. On the other hand, the coarse part of the inorganic particles can increase the heat conductivity of the bonding material. Due to such functions of the particles, it is possible to balance the contradictory properties, that is, the improvement of the flow properties as well as water-holding properties of the slurry and the increase of the heat conductivity.

In the present invention, each powder is observed by a scanning type electron microscope, long axis/short axis ratios (long axis/short axis) of the individual inorganic particles are measured, whereby the average value of the ratios is the long axis/short axis ratio.

Moreover, the inorganic particles generally do not have a completely spherical shape, and usually have various shapes such as an elliptically spherical shape, a flat plate-like shape, a columnar shape, a rod-like shape or the like. When the particle diameters of the inorganic particles are referred, long and short particle diameters are present. According to the measurement of a ratio between the long particle diameter and the short particle diameter as the long axis/short axis ratio (the long axis/short axis), in the present invention, the ratio is preferably from 1.0 to 4.0, especially preferably from 1.0 to 3.4.

The bonding material is preferably inorganic particles which satisfy the above conditions of D90/D10, D90 and D10, and is preferably at least one selected from the group consisting of silicon carbide, silicon nitride, aluminum nitride, boron nitride, silica, alumina, mullite, zirconia, zirconium phosphate, alumina titanate, titania and cordierite. The bonding material is especially preferably inorganic particles of at least one selected from the group consisting of silicon carbide, silicon nitride, alumina and cordierite.

The bonding material preferably further comprises inorganic fibers. Examples of the inorganic fibers include oxide fibers of aluminosilicate, alumina, magnesium silicate or the like, and the other fibers (e.g., SiC fibers).

In the present invention, the fibers are observed by the scanning type electron microscope, and the fiber lengths and diameters of the individual fibers are measured to calculate the average length and average diameter of the fibers.

As the inorganic fibers of the present invention, the oxide fibers are most preferable. Specifically, preferable examples of the inorganic fibers include ceramic fibers of silica, mullite, alumina, silica-alumina, silica-magnesia or the like. The inorganic fibers preferably have an average length of 30 to 600 μm and an average diameter of 1 to 20 μm, and especially preferably have an average length of 50 to 500 μm and an average diameter of 1 to 20 μm.

The bonding material of the present invention preferably comprises a colloidal oxide and an inorganic binder. Examples of the colloidal oxide include silica sol, alumina sol, colloidal silica, colloidal alumina or the like. They may be used alone or as a combination of two or more of them. Examples of the inorganic binder include silica sol, alumina sol, clay or the like.

The bonding material of the present invention preferably further comprises an organic binder and a hollow filler.

The organic binder is usually a binding agent which is an organic substance, and the binding agent is an agent used for binding or fixing homogeneous or heterogeneous solids to form a material, a product or the like. When a ceramic material is manufactured, the organic binder is usually various organic compounds to be added so that ceramic material powder becomes formable and is provided with a strength necessary for maintaining the shape thereof. Therefore, examples of the typical organic binder include naturally derived starch, gelatine, agar, semi-synthetic alkylcelluloses (e.g., methylcellulose), cellulose derivatives such as carboxymethylcellulose, polyvinyl alcohols, polyacrylic polymers, polyacrylamides, synthetic water-soluble polymers such as polyethylene oxides or the like. Examples of the organic binder of the present invention include polyvinyl alcohol (PVA), carboxymethylcellulose (CMC), methylcellulose (MC) or the like.

The hollow filler is usually organic and/or inorganic hollow particles as follows. Examples of the organic hollow particulate filler include acrylic hollow particles, foam particles, resin balloon, a sponge-like foam material or the like. Examples of the inorganic hollow particulate filler include hollow oxide fine particles such as hollow titanium oxide particles, hollow iron oxide, fly ash balloon or the like.

Figure 1B:
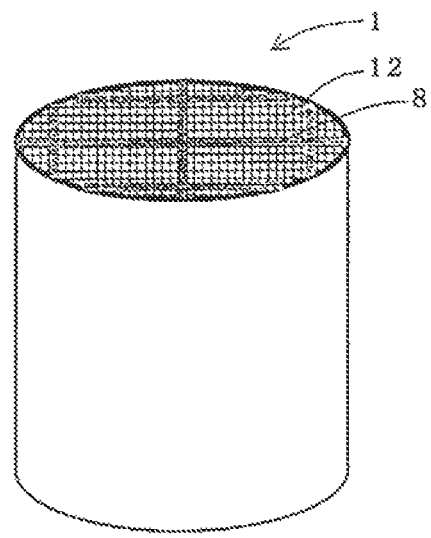
FIG. 1B is a drawing for explaining one embodiment of the honeycomb structure of the present invention, and shows a perspective view of the honeycomb structure.
Figure 1C:
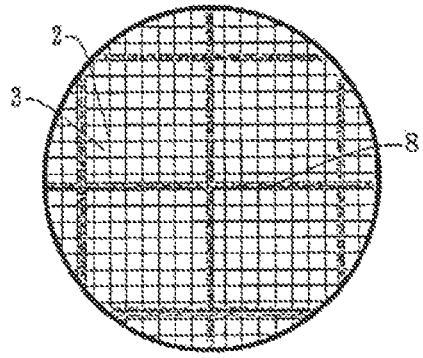
FIG. 1C is a drawing for explaining one embodiment of the honeycomb structure of the present invention, and shows a plan view of the honeycomb structure.

FIGS. 1A to C are drawings for explaining one embodiment of a honeycomb structure bonded by using the bonding material of the present invention, FIG. 1A shows a perspective view of a honeycomb segment, FIG. 1B shows a perspective view of the honeycomb structure, and FIG. 1C shows a plan view of the honeycomb structure. A honeycomb structure 1 of the present embodiment comprises a plurality of honeycomb segments 12, and each honeycomb segment comprises a cell structure 5 comprising a plurality of cells 3 as fluid through channels partitioned by porous partition walls 2 and a porous outer wall 7 provided on the outer periphery of the cell structure 5. The outer walls 7 of these honeycomb segments are bonded to one another by a bonding material 8 to integrally form the honeycomb structure.

In the present invention, the materials can be mixed and kneaded by a heretofore known mixer or kneader, for example, a sigma kneader, Banbury mixer, a screw type extrusion kneader or the like. In particular, the use of a kneader (a so-called vacuum clay kneader) comprising a vacuum pressure reduction device (e.g., a vacuum pump or the like) for expelling air included in a clay is preferable in that the clay having only little defect and having satisfactory forming properties can be obtained.

The honeycomb structure of the present invention is manufactured by bonding the honeycomb segments with the bonding material. The honeycomb segments are prepared as follows. A binder such as methylcellulose, hydroxypropoxyl methylcellulose or the like, a surfactant, water or the like are added to the material, for example, silicon carbide, silicon carbide powder and metal silicon powder for forming a silicon carbide-metal silicon compounds, or another ceramic material. This mixture is kneaded to form a plastic clay. Next, the obtained clay is extruded in a forming step to form a formed honeycomb article comprising a plurality of cells which become fluid through channels partitioned by the partition walls. For the extrusion, a plunger type extruder, a biaxial screw type continuous extruder or the like may be used. The use of the biaxial screw type continuous extruder enables continuously to perform a clay preparing step and a forming step. The obtained formed honeycomb article is dried by, for example, microwaves, dielectric heating and/or hot air or the like, and then fired, whereby a fired honeycomb article can be obtained.

The obtained fired honeycomb article is processed if necessary, so as to obtain the honeycomb segments having a predetermined shape. The article can be processed by using a machine such as a band saw, a metal saw or the like, thereby obtaining the square post-like honeycomb segments each having a bonding surface.

There is not any special restriction on a method for coating the honeycomb segments with the bonding material, and, for example, a spray method, a coating method with a brush, an ink brush or the like, a dipping method or the like may be employed.

The bonded honeycomb structure is dried by the-hot air or the like to fly and scatter water included in the bonding material, thereby developing such a strength as to keep the shape thereof. In this case, the temperature rise in the vicinity of the bonding material becomes stagnant at 75 to 100° C. due to the heat of the water gasification. During this time, locally strong and weak portions are scattered in a bonded part, and the vibration or weight of the bonded part causes the non-uniformity of bonding contraction and the misalignment of the bonded part. To solve the problem, an organic binder having a binding force or thermal gelation properties is added to the bonding material to impart the strength thereto before the stagnation of the temperature rise. If the amount of this organic binder is less than 0.1 mass %, the binding force or thermal gelation properties thereof cannot pervade the whole particles of the bonding material, and hence the effects of the binding force and thermal gelation behavior cannot be expected. The honeycomb structure is preferably bonded with the bonding material containing the organic binder of 0.1 mass % or more. Especially when the organic binder of 0.2 mass % or more is contained, the effect of the binder becomes remarkable. If the amount of the organic binder exceeds 5 mass %, a large amount of water is necessary for preparing the bonding material slurry, and pores increase in the dried bonding material after the slurry is dried, thereby decreasing the strength of the bonding material. Especially preferable examples of the organic binder having the binding force or the thermal gelation properties include a cellulose derivative such as methylcellulose, carboxymethylcellulose or the like, polyvinyl alcohol or the like.

Moreover, the effect of a thermosetting resin as a hardening accelerator during the drying can be expected. The thermosetting resin is usually a compound of natural and synthetic resins or the like having such properties that a liquid-like or plastic substance is hardened, that is, infusibilized by a catalytic function, an energy such as heating or light irradiation or the like. The thermosetting resin of the present invention causes a crosslinking reaction among molecules by the heating, and changes to an infusible/insoluble polymer having a three-dimensional net-like structure. Examples of the thermosetting resin include an urea resin, a melamine resin, a phenol resin, an epoxy resin, an unsaturated polyester resin, an acrylic resin or the like. Any one of the resins has a chemically reactive functional group in the molecules thereof, and the properties of a hardened substance vary in accordance with a chemical composition. In the present invention, the thermosetting resin may be used as the hardening accelerator during the drying, and the phenol resin, the epoxy resin or the like is especially preferable.

Furthermore, when the bonding material containing the organic binder having the thermal gelation properties or the thermosetting resin is used to reach a thickening start temperature or a thermosetting temperature for a further shorter time, a drying method with the microwaves, or a method for heating the honeycomb structure from not only the outside but also the inside thereof to proceed with the drying also exerts the effect. The use of the heated honeycomb segments can shorten a temperature rise time to the thickening start temperature or the thermosetting temperature. A bonding method for immediately exposing the honeycomb structure bonded by using the bonding material to the atmosphere of 100° C. is also effective.

In the present invention, "to dry" the bonding material mentioned herein is that to evaporate and solidify (gelate) a liquid component at such a temperature that components contained in the bonding material do not melt, that is, such a temperature that the components are not substantially fired. That is, in the honeycomb structure of the present embodiment, the bonding material is not fired but is only dried to form bonding layers, whereby the outer walls of the honeycomb segments are bonded to one another to form the honeycomb structure. In consequence, bonding defects such as the cracking of the bonding layers and the peeling-off of the bonding layers themselves due to a difference in thermal expansion coefficient or contraction percentage between the bonding layers and the honeycomb segments do not easily occur.

Moreover, in the honeycomb structure of the present embodiment, the bonding material is not fired but is only dried to form the bonding layers, whereby the outer walls of the honeycomb segments are bonded to one another. Therefore, especially when a large-sized honeycomb structure is formed, the effect that the bonding defects do not easily occur is remarkably exerted.

It is to be noted that at least a part of the outer periphery of the honeycomb structure (the bonded article) formed by bonding the honeycomb segments may be removed if necessary.

Moreover, the bonding material of the present invention is not fired but is only dried to form the bonding layers, whereby bonding targets can be bonded to one another. Therefore, especially when the bonding targets are large (an area coated with the bonding material is large), the effect that the bonding defects do not easily occur is remarkably exerted.

EXAMPLES

Hereinafter, the present invention will be described in more detail based on examples, but the present invention is not limited to these examples.

Examples 1 to 18, Comparative Examples 1 to 4

As materials, SiC powder and Si powder were mixed at a mass ratio of 80:20, starch and resin balloon were added as a pore former to this mixture, and methylcellulose, hydroxypropoxyl methylcellulose, surfactant and water were further added thereto, thereby preparing a plastic clay. This clay was extruded, and dried by microwaves and hot air to obtain a honeycomb segment having a partition wall thickness of 310 µm, a cell density of about 46.5 cells/cm$^2$ (300 cells/square inch), a square section with each side of 35 mm and a length of 152 mm. In this honeycomb segment, the resultant was plugged at one of its two sides so as to form the adjacent through pores alternately by using a material similar to the one used for bonding honeycomb segments in such a manner that each face showed a checkered pattern, followed by drying and degreasing at about 400° C. under the ambient atmosphere. Afterward, the segment was fired at about 1450° C. under an Ar inert atmosphere to obtain the fired honeycomb segment of Si bonded to SiC.

As inorganic particles, silicon carbide powder, silicon nitride powder, alumina powder or cordierite powder having properties shown in Table 1 were added in 40 mass %; alumina silicate fibers having lengths shown in Table 1 were added as oxide fibers in 30 mass %; carboxymethylcellulose was added as an organic binder in mass % shown in Table 1; colloidal silica was added as an inorganic binder in 20 mass %; and water of 9.5 mass % was added, followed by kneading for 30 minutes, to obtain each bonding material slurry of Table 1. Then, after grinding the outer periphery of a bonded article obtained by bonding and then drying 16 fired honeycomb segments described above, the outer peripheral part of the bonded article was coated with a coating material, and dried at 200° C. for two hours, to obtain a honeycomb structure. Among bonding materials A to R in Table 1, A to J and O to R were used for examples of the present invention as described later, and K to N were used for comparative examples.

D10, D90 of silicon carbide, silicon nitride, alumina and cordierite were obtained according to JIS R1629 (a particle diameter distribution measurement by a laser diffraction/scattering method of a fine ceramic material). D10, D90 are the values of 10% diameter and 90% diameter from a smaller particle diameter side in volume-based integrated fractions of a particle diameter distribution measurement by the laser diffraction/scattering method.

As to the bonding material, the flow properties, water-holding properties and heat conductivity thereof were measured and evaluated, respectively. The flow properties were evaluated by the presence of the generation of a gap in the bonded part of the bonded article, which is obtained by bonding the honeycomb segments coated with each slurry and left to stand at room temperature for three minutes or ten minutes. The water-holding properties were evaluated by the presence of the drying surface of bonding material slurry respectively left to stand at room temperature for three minutes or ten minutes. The heat conductivity was evaluated by a laser flash method to the bonding material cut out from the prepared honeycomb structure. Results are shown in Tables 2 to 6.

TABLE 1

| Bonding material No. | Inorganic particle type | Inorganic particle grain size | | | | Fiber length µm | Carboxymethyl-cellulose % |
|---|---|---|---|---|---|---|---|
| | | D10 µm | D90 µm | D90/D10 | Long axis/short axis | | |
| A | Silicon carbide | 0.80 | 8.1 | 10.1 | 1.1 | 300 | 0.5 |
| B | Silicon carbide | 1.10 | 26.4 | 24.0 | 1.5 | 300 | 0.5 |
| C | Silicon carbide | 1.60 | 31.6 | 19.8 | 3.4 | 300 | 0.5 |
| D | Silicon carbide | 14.6 | 215 | 14.7 | 1.3 | 300 | 0.5 |
| E | Silicon carbide | 1.90 | 815 | 429 | 1.4 | 300 | 0.5 |
| F | Silicon nitride | 1.20 | 24.3 | 20.3 | 1.3 | 300 | 0.5 |
| G | Alumina | 1.40 | 27.5 | 19.6 | 1.7 | 300 | 0.5 |
| H | Cordierite | 1.10 | 30.1 | 27.4 | 1.4 | 300 | 0.5 |
| I | Silicon carbide | 1.10 | 26.4 | 24.0 | 1.5 | 50 | 0.5 |
| J | Silicon carbide | 1.10 | 26.4 | 24.0 | 1.5 | 500 | 0.5 |
| K | Silicon carbide | 0.21 | 3.5 | 16.7 | 1.7 | 300 | 0.5 |
| L | Silicon carbide | 125 | 1310 | 10.5 | 1.4 | 300 | 0.5 |
| M | Silicon carbide | 5.30 | 21.4 | 4.04 | 1.6 | 300 | 0.5 |
| N | Silicon carbide | 1.30 | 821 | 632 | 1.8 | 300 | 0.5 |
| O | Silicon carbide | 1.20 | 34.2 | 28.5 | 4.6 | 300 | 0.5 |
| P | Silicon carbide | 1.10 | 26.4 | 24.0 | 1.5 | 15 | 0.5 |
| Q | Silicon carbide | 1.10 | 26.4 | 24.0 | 1.5 | 700 | 0.5 |
| R | Silicon carbide | 1.10 | 26.4 | 24.0 | 1.5 | 300 | 0.05 |

TABLE 2

| | Bonding material No. | Gap in bonded part (Flow properties) | | Water-holding properties | | Heat conductivity W/mK |
|---|---|---|---|---|---|---|
| | | Bonded after 3 min. | Bonded after 10 min. | After 3 min. | After 10 min. | |
| Example 1 | A | None | None | Non-dried | Non-dried | 1.0 |
| Example 2 | B | None | None | Non-dried | Non-dried | 1.3 |
| Example 3 | D | None | None | Non-dried | Non-dried | 2.1 |
| Example 4 | E | None | None | Non-dried | Non-dried | 3.0 |
| Comparative Example 1 | K | None | None | Non-dried | Non-dried | 0.21 |
| Comparative Example 2 | L | Present | Present | Dried | Dried | 4.3 |
| Comparative Example 3 | M | Present | Present | Non-dried | Non-dried | 1.3 |
| Comparative Example 4 | N | Present | Present | Non-dried | Non-dried | 4.0 |

As shown in Table 2, in Examples 1, 2, 3 and 4, a value of D90/D10 of the inorganic particles was between 10 and 500, D10 was 100 μm or less, and D90 was 4 μm or more, so that the effect of the present invention was achieved, that is, the heat conductivity was increased while securing the flow properties as well as the water-holding properties.

On the other hand, in Comparative Example 1, D90 was 3.5 μm, which was less than 4 μm, and hence the heat conductivity decreased to 0.24. In Comparative Example 2, D10 was 125 μm, thereby noticeably lowering the water-holding properties, and the surface of the bonding material slurry was dried within three minutes, so that the flow properties of the slurry noticeably lowered to generate the gap in the bonded part. In Comparative Example 3, the inorganic particles had D90/D10 of 4.04, which was less than 10, and the effect of small particles as rollers lowered, so that the flow properties of the slurry noticeably lowered to generate the gap in the bonded part. Moreover, in Comparative Example 4, the inorganic particles had D90/D10 of 632, which was more than 500, and hence the flow properties of the slurry noticeably lowered to generate the gap in the bonded part in the same manner as in Comparative Example 3.

According to the results of Table 2, the excellent effect was confirmed from the bonding material for the honeycomb structure containing inorganic particles in which D90/D10 was from 10 to 500, D10 was 100 μm or less, and D90 was 4 μm or more.

As shown in Table 3, in Examples 5, 6, the long axis/short axis ratios of the inorganic particles were 1.5 and 3.4, respectively, and the values were less than 4.0, so that the bonding material of these examples were excellent in flow properties, water-holding properties and heat conductivity. On the other hand, in Example 7, the long axis/short axis ratio of the inorganic particles was 4.6, when the segments were bonded with the bonding material, left to stand for three minutes after coating, any gap was not generated in the bonded part. However, unlike Examples 5 and 6, when the segments were bonded with the bonding material, left to stand for ten minutes after coating, the flow properties of the slurry lowered, and the gap was generated in the bonded part. The segments coated with the bonding material are rarely left to stand for ten minutes before bonded, and hence any practical problem does not occur.

According to the results of Table 3, the excellent effect was confirmed from the bonding material for the honeycomb structure containing the inorganic particles in which D90/D10 was from 10 to 500, D10 was 100 μm or less, D90 was 4 μm or more and a long axis/short axis ratio was from 1.0 to 4.0.

TABLE 3

| | Bonding material No. | Gap in bonded part (Flow properties) | | Water-holding properties | | Heat conductivity W/mK |
|---|---|---|---|---|---|---|
| | | Bonded after 3 min. | Bonded after 10 min. | After 3 min. | After 10 min. | |
| Example 5 | B | None | None | Non-dried | Non-dried | 1.3 |
| Example 6 | C | None | None | Non-dried | Non-dried | 1.4 |
| Example 7 | O | None | Present | Non-dried | Non-dried | 1.2 |

TABLE 4

| | Bonding material No. | Gap in bonded part (Flow properties) | | Water-holding properties | | Heat conductivity W/mK |
|---|---|---|---|---|---|---|
| | | Bonded after 3 min. | Bonded after 10 min. | After 3 min. | After 10 min. | |
| Example 8 | B | None | None | Non-dried | Non-dried | 1.3 |
| Example 9 | F | None | None | Non-dried | Non-dried | 1.1 |
| Example 10 | G | None | None | Non-dried | Non-dried | 0.56 |
| Example 11 | H | None | None | Non-dried | Non-dried | 0.62 |

As shown in Table 4, silicon carbide used as the seed of the inorganic particles in Example 8 was changed to silicon nitride in Example 9, alumina in Example 10, and cordierite in Example 11, but substantially the same flow properties and water-holding properties of the slurry could be confirmed. According to the results of Table 4, the excellent effects of silicon nitride, alumina and cordierite in addition to silicon carbide as the inorganic particles in the bonding material slurry or the bonding material were confirmed.

TABLE 5

| | Bonding material No. | Gap in bonded part (Flow properties) | | Water-holding properties | | Heat conductivity W/mK |
|---|---|---|---|---|---|---|
| | | Bonded after 3 min. | Bonded after 10 min. | After 3 min. | After 10 min. | |
| Example 12 | B | None | None | Non-dried | Non-dried | 1.3 |
| Example 13 | I | None | None | Non-dried | Non-dried | 1.1 |
| Example 14 | J | None | None | Non-dried | Non-dried | 1.5 |
| Example 15 | P | None | None | Non-dried | Non-dried | 0.53 |
| Example 16 | Q | None | Present | Non-dried | Dried | 1.9 |

As shown in Table 5, the lengths of the fibers used in the bonding material were 300 μm in Example 12, 50 μm in Example 13 and 500 μm in Example 14. On the other hand, the lengths were 15 μm in Example 15 and 700 μm in Example 16. As shown in Table 5, in Examples 12 to 14, any gap was not generated in the bonded part, and the water-holding properties and heat conductivity were satisfactory. On the other hand, in Example 15 containing fiber lengths of 30 μm or less, the heat conductivity decreased, but a heat conductivity of 0.5 W/mK was secured, which did not cause any practical problem. Moreover, in Example 16 containing fiber lengths of 601 μm or more, the fibers had a ball-like shape. In the example, when the segments were bonded with the bonding material, left to stand for three minutes after coating, any gap was not generated in the bonded part. However, when the segments were bonded with the bonding material, left to stand for ten minutes after coating, the flow properties of the slurry lowered, and the gap was generated in the bonded part. The segments coated with the bonding material are rarely left to stand for ten minutes before bonded, and hence any practical problem does not occur.

According to the results of Table 5, the excellent effect of the bonding material for the honeycomb structure containing oxide fibers which have an average fiber length of 30 to 600 μm and an average particle diameter of 1 to 20 μm was confirmed.

TABLE 6

| | Bonding material No. | Gap in bonded part (Flow properties) | | Water-holding properties | | Heat conductivity W/mK |
|---|---|---|---|---|---|---|
| | | Bonded after 3 min. | Bonded after 10 min. | After 3 min. | After 10 min. | |
| Example 17 | B | None | None | Non-dried | Non-dried | 1.3 |
| Example 18 | R | None | Present | Non-dried | Dried | 1.0 |

As shown in Table 6, the amount of the organic binder added to the bonding material was 0.5 mass % in Example 17, and 0.05 mass % in Example 18. In Example 17, any gap was not generated in the bonded part, and the water-holding properties and heat conductivity were satisfactory. On the other hand, in Example 18 in which the added amount of the organic binder was 0.05 mass %, when the segments were bonded with the bonding material, left to stand for three minutes after coating, any gap was not generated in the bonded part. However, when the segments were bonded with the bonding material, left to stand for ten minutes after coating, the flow properties of the slurry lowered, and the gap was generated in the bonded part. The segments coated with the bonding material are rarely left to stand for ten minutes before bonded, and hence any practical problem does not occur.

INDUSTRIAL APPLICABILITY

A bonding material for a honeycomb structure and the honeycomb structure in the present invention are effectively utilized in various industrial fields requiring various filters, for example, in a diesel engine exhaust gas treatment device, a dust removing device, a water treatment device or the like.

The invention claimed is:

1. A bonding material for a honeycomb structure, comprising:
   inorganic particles, all of which are non-spherical and all of which have a D90/D10 from 10 to 500, a D10 of 100 μm or less and a D90 of 4 μm or more; and
   oxide fibers having an average length of 30 to 600 μm and an average diameter of 1 to 20 μm;
   wherein the D10 and D90 are the values of 10% diameter and 90% diameter from a smaller particle diameter side, respectively, in volume-based integrated fractions of a particle diameter distribution measurement by a laser diffraction/scattering method; and
   wherein an average long axis/short axis ratio of each of the inorganic particles is in a range of 1.1 to 4.0.

2. The bonding material for the honeycomb structure according to claim 1, which comprises the inorganic particles of at least one selected from the group consisting of silicon carbide, silicon nitride, aluminum nitride, boron nitride, silica, alumina, mullite, zirconia, zirconium phosphate, alumina titanate and titania.

3. The bonding material for the honeycomb structure according to claim 2, which further comprises a colloidal oxide and an inorganic binder.

4. The bonding material for the honeycomb structure according to claim 2, which further comprises an organic binder and a hollow filler.

5. The bonding material for the honeycomb structure according to claim 1, which further comprises a colloidal oxide and an inorganic binder.

6. The bonding material for the honeycomb structure according to claim 1, which further comprises an organic binder and a hollow filler.

7. A honeycomb structure which is bonded with the bonding material according to claim 1.

* * * * *